United States Patent [19]

Date et al.

[11] Patent Number: 4,918,533
[45] Date of Patent: Apr. 17, 1990

[54] IMAGE SENSING DEVICE WITH SHUTTER-READOUT COORDINATION

[75] Inventors: Nobuaki Date; Nobuo Tezuka; Syuichiro Saito; Akihiko Tojo, all of Kanagawa; Susumu Kozuki, Tokyo, all of Japan

[73] Assignee: Canon Kabushiki Kaisha, Tokyo, Japan

[21] Appl. No.: 248,270

[22] Filed: Sep. 20, 1988

Related U.S. Application Data

[63] Continuation of Ser. No. 83,010, Aug. 5, 1987, abandoned, which is a continuation of Ser. No. 668,741, Nov. 6, 1984, abandoned.

[30] Foreign Application Priority Data

| Nov. 11, 1983 | [JP] | Japan | 58-211912 |
| Nov. 11, 1983 | [JP] | Japan | 58-211913 |
| Nov. 11, 1983 | [JP] | Japan | 58-211914 |
| Jul. 8, 1984 | [JP] | Japan | 59-165458 |
| Jul. 8, 1984 | [JP] | Japan | 59-165459 |

[51] Int. Cl.$^4$ .......................................... H04N 3/14
[52] U.S. Cl. ................... 358/213.13; 358/213.19; 358/909; 358/228
[58] Field of Search .............. 358/228, 213.13, 213.19, 358/213.26, 225, 209, 909

[56] References Cited

U.S. PATENT DOCUMENTS

| 4,541,016 | 9/1985 | Ochi et al. | 358/228 |
| 4,597,014 | 6/1986 | Suzuki | 358/213.19 |
| 4,599,657 | 7/1986 | Kinoshita et al. | 358/228 |
| 4,692,815 | 9/1987 | Kawahara et al. | 358/909 |

FOREIGN PATENT DOCUMENTS 2134349  8/1984  United Kingdom ................ 358/909

*Primary Examiner*—Jin F. Ng
*Assistant Examiner*—Stephen Brinich
*Attorney, Agent, or Firm*—Toren, McGeady & Associates

[57] ABSTRACT

An image sensing device comprises image sensing apparatus for converting an optical image into an electrical signal; shutter apparatus for blocking light incident upon the image sensing apparatus; periodic signal generating apparatus for forming periodic signals which are produced for periodically reading the electrical signal of the image sensing apparatus; a switch for giving an instruction to operate the shutter apparatus; first timer apparatus to operate in response to a predetermined periodic signal produced after the switch is operated; and shutter driving apparatus which begins to operate for opening the shutter apparatus after the lapse of a predetermined time counted by the timer apparatus. The device is capable of cancelling a delay in the operation of the shutter apparatus, etc. by the first timer apparatus. The device is provided with closure detecting apparatus to detect a shift of the shutter apparatus from an open state to a closed state; and an inhibiting apparatus to inhibit the above-stated reading by the periodic signal generating apparatus until the output of the closure detecting apparatus is obtained after commencement of a still picture image sensing process. This arrangement deletes any adverse effect of a bounce or bound of the shutter apparatus even if it takes place at the end of a shutter travel. The device is provided further with second timer apparatus which operates in response to a predetermined periodic signal obtained after the switch is operated. The shutter driving apparatus starts to open the shutter apparatus after the lapse of a predetermined length of time counted by the first timer apparatus and starts to close the shutter apparatus after the lapse of another length of time counted by the second timer apparatus, so that the shutter apparatus can be opened and closed with highly precise timing.

77 Claims, 9 Drawing Sheets

IMAGE SENSING DEVICE WITH SHUTTER-READOUT COORDINATION

This is a continuation of application Ser. No. 07/083,010, filed Aug. 5, 1987, abandoned; which is a continuation of Ser. No. 06/668,741, filed Nov. 6, 1984, abandoned.

BACKGROUND OF THE INVENTION

1. Field of the Invention:

This invention relates to an image sensing device which performs exposure control by means of a shutter.

2. Description of the Prior Art:

There have been known video cameras of the kind contrived to perform exposure control by means of a shutter. The video camera of this kind, however, must have the shutter operation synchronized with a video camera scanning operation, because the camera is generally required to perform scanning at a timing synchronized with a standard television system.

Figure 2:
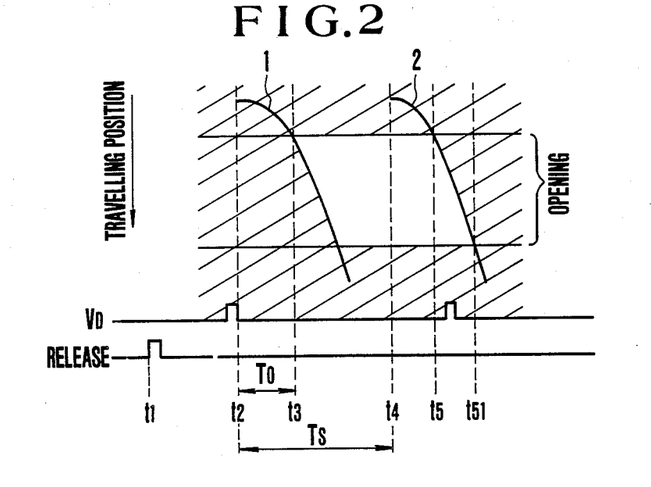
FIG. 2 is a timing chart showing the operation timing of the shutter shown in FIGS. 1 (a)–1 (e).

For synchronizing th shutter with the camera, there has been known a method of operating the shutter at a timing determined by the logical product of a shutter release signal and a vertical synchronizing signal relative to scanning of the video camera. However, this method of the prior art presents many problems. Referring to FIG. 1 (a) of the accompanying drawings, a shutter which consists of two blades 1 and 2 is at first in repose. Under this condition, the image of an object to be photographed is prevented by the shutter blade 1 from reaching an image sensor 3. Then, as shown in FIG. 1 (b), the light from the object becomes incident on the sensor 3 as the shutter blade 1 begins to travel. The travel of the blade 1 comes to an end, as shown in FIG. 1 (c). When a predetermined period of time lapses after the start of the travel of the shutter blade 1, another blade 2 begins traveling as shown in FIG. 1 (d). Th sensor 3 then begins to be shielded from light until it is completely shielded by the blade 2, as shown in FIG. 1 (e). The operation timing of the shutter blades 1 and 2 is as follows:

Referring to FIG. 2, with a shutter release switch turned on at a point of time t1, the shutter blade 1 begins to travel at a point of time t2 synchronzed with, for example, a vertical scanning signal VD obtained immediately after operation of the switch. However, the shutter blade 1 at first has an accelerating motion and then has a constant speed motion. In order to have an exposure time accurately controlled, therefore, the light receiving surface of the image sensor 3 is preferably exposed to light after the shutter blade 1 has reached the constant speed motion. However, such as arrangement results in a delay time (t3−t2) before the light receiving surface of the image sensor 3 begins to be actually exposed to light at a point of time t3. This delay time depends on the responsivity of the shutter. In the case of a mechanical shutter, therefore, a delay time of about 8 msec is expected. Besides, it tends to vary with temperature and the lack of precision of the parts used. Furthermore, with the delay time thus being as much as ⅓ of one field period, the shutter operation would not be accomplished within the period of one field and would bring about various problems such as smearing etc. in the event of an exposure time close to one field period. The vertical synchronizing signal VD (FIG. 2) to be used for reading out must not be within a span of time from a point of time t3 to a point of tim t51. Therefore, timing for the start point t4 of the shutter blade 2 which defines the point of time t51 is important. Furthermore, since the length of time between the points of time t4 and t51 greatly varies with the degree of precision of the parts forming a mechanical shutter and ambient conditions such as temperature and humidity, precise setting of the shutter start time t4 alone does not always ensure a sufficiently adequate point of time t51 In FIG. 2, one vertical synchronizing signal VD is shown located between points of time t3 and t51. However, in this event, a smear is produced because an electrical signal representing a sensed image is read out at the timing of the vertical synchronizing signal VD.

Meanwhile, with respect to the closing movement of the shutter blade 1 the blade 1 begins to close at a point of time t4 after the lapse of a predetermined period of time Ts from the starting point of time t2 of the above-stated opening movement of the shutter. Then, the shutter blade 2 begins to actually close or shield the light receiving surface of the image sensor 3 at a point of time t5 and completely shields the light receving surface of the sensor 3 at a point of time t51.

With the device arranged in this manner, the shutter first begins to perform an opening action at a point of time t2 or according to the timing of a first vertical synchronizing signal. Then, after the lapse of an electrical delay time Ts from this point of time t2, the shutter begins to perform a closing action at the point of time t4. The time t51 after the mechanical action delay time (t51−t4) required for closing the shutter is adjusted to the timing of another vertical synchronizing signal produced for the next of electric charge transfer. However, in accordance with this arrangement, the mechanical action delay time (t51−t4) and the electrical delay time Ts are connected in series. As a result, a large error tends to develop depending on the ambient conditions such as temperature, humidity, etc. and the precision of the parts.

Theoretically, the timing of the synchronizing signal for the electric charge transfer must come immediately after the time t51 at which closing of the shutter is completed. However, in the event of the above-stated large error, some inconvenience might arise.

Furthermore, the S/N ratio decreases as the exposure time given by the shutter becomes shorter. This is because the dark current component which develops during one field accumulation period is almost constant at a constant temperature and is not relative to the exposure time.

It is a general object of this invention to provide an image sensing device which is capable of eliminating the above-stated shortcomings of the prior art.

It is a more specific object of the invention to provide an image sensing device which is capable of suppressing an adverse effect of the delayed response of the shutter.

It is another specific object of the invention to provide an image sensing device which is capable to stably adjusting the timing for shielding an image sensing means to the timing for driving the image sensing means.

It is further object of the invention to provide an image sensing device which is capable of accurately adjusting timing of the commencement of a shutter opening operation to timing of the commencement of a shutter closing operation.

It is further object of the invention to provide an image sensing device in which the S/N ratio never decreases even in the event of a short exposure time.

It is a still further object of the invention to provide an image sensing device which permits exposure time adjustment without difficulty.

It is an additional object of the invention to provide an image sensing device, wherein smears and the like do not readily arise and exposure time adjustment can be accomplished without difficulty.

SUMMARY OF THE INVENTION

To attain these objects, an embodiment of the invention comprises image sensing means to convert an optical image into an electrical signal; shutter means to prevent light from reaching the image sensing means; periodic signal generating means to form periodic signals for periodically reading out the electrical signal of the image sensing means; a switch to give instruction for operating the shutter means; timer means to operate in response to a predetermined periodic signal produced after the operation of the switch; and shutter driving means to cause the shutter means to open after the lapse of a predetermined length of time counted by the timer means, so that any adverse effect of a delay in the operation of shutter mechanism can be suppressed.

Furthermore, in the embodiment of the invention, the sum of a length of time from the start of the shutter means to commencement of actual exposure and the time counted by the timer means is longer than the period of the periodic signal. Therefore, the timing of a periodic signal produced several periods after the operation of the switch can be adjusted to the timing of the actual opening of the shutter. Furthermore, in this embodiment, the length of time between the start of the shutter means and the commencement of actual exposure of the image sensing means is set to be shorter than the period of the periodic signal. Therefore, the shutter can be actually opened in synchronization with the periodic signal produced for the second time after the switch is operated. In this embodiment, there is provided second timer means which operates in response to a predetermined periodic signal produced after operation of the switch to give instruction for operating the shutter means. The shutter means in thus opened by the second timer means after a predetermined length of time counted by the above-stated first timer means. After a predetermined length of time counted by the second timer means, the shutter means is closed by the shutter driving means. This arrangement of the embodiment ensures accurate timing for opening and closing of the shutter. Besides, the opening action of the shutter means can be effectively prevented from delaying. Furthermore, this embodiment includes the closures detecting means which detects that the shutter means shifts from an open state to a closed state and the inhibiting means, which inhibits the above-stated transfer from being effected by the above-stated periodic signal generating means after commencement of a still picture image sensing process until the output of the closure detecting means, is obtained. Therefore, uneven exposure and smears due to fluctuations of responsivity in the closing of the shutter means can be prevented. It is another advantage of the embodiment that smears can be prevented from occurring because the end of the exposure control period comes immediately before the beginning of a periodical reading out process.

Furthermore, while the end of the exposure control period comes immediately before the start of the periodic reading out process, the electrical signal of the image sensing means is cleared before the commencement of the exposure control. Therefore, no smear is caused by an excessive electric charge obtained before an exposure.

The above and further objects, advantages and features of the invention will become apparent from the following description of embodiments thereof taken in conjunction with the accompanying drawings.

BRIEF DESCRIPTION OF THE DRAWINGS

FIGS. 1 (a)–1 (e) illustrate the operation of the conventional shutter device.

DETAILED DESCRIPTION OF THE PREFERRED EMBODIMENTS

Figure 3:
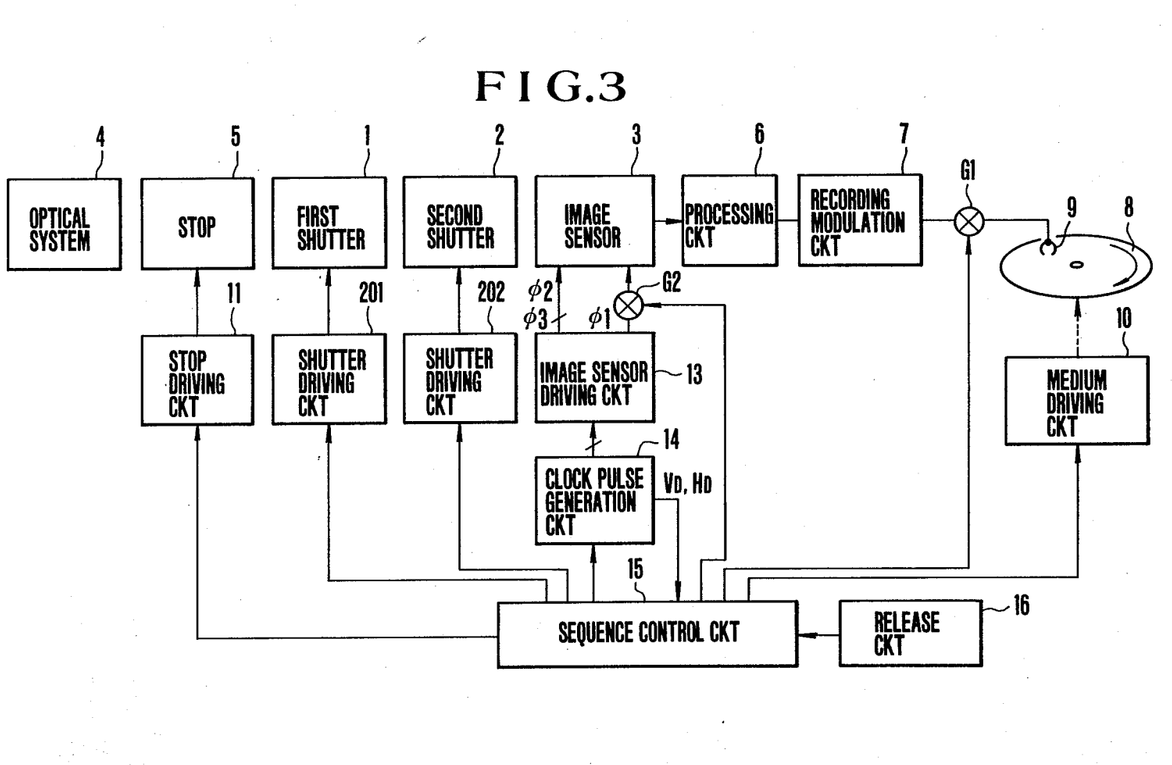
FIG. 3 is a block diagram showing, by way of example, the arrangement of an image sensing device embodying the present invention.
Figure 4:
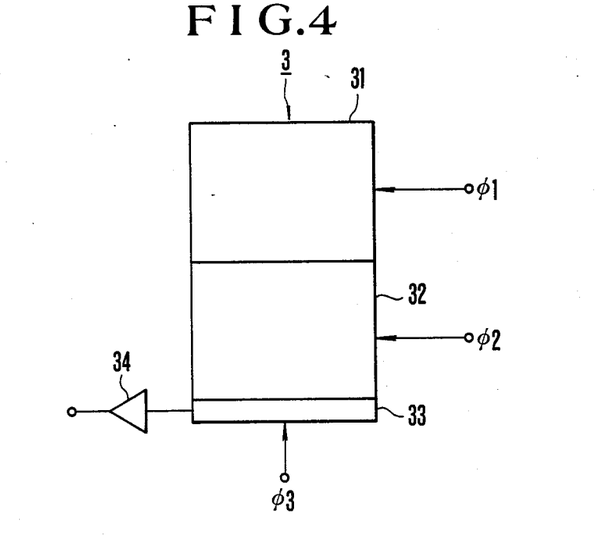
FIG. 4 is a diagram schematically showing, by way of example, the arrangement of an image sensor.

Referring to FIG. 3 which shows, by way of example, the arrangement of an image sensing device according to the present invention, the device includes an image sensing optical system 4; a stop 5; the shutter blades 1 and 2 which jointly form the above-stated shutter means; the image sensor 3 which is, for example, a CCD or MOS or a camera tube and which converts an optical image into an electrical signal; a processing circuit 6 to process the output of the image sensor 3 by performing γ conversion, outline compensation, black level clamping, etc.; a recording modulation circuit 7 to make the ouput of the processing circuit into a signal suited for recording on a record bearing medium 8; analog gate circuits G1 and G2; a head 9 to record the signal on the rotating record bearing medium 8; a medium driving circuit 10 which includes a motor, etc. to rotate the medium 8; a stop driving circuit 11 to control opening or closing of the stop 5; first and second shutter driving circuits 201 and 202 which respectively drive the shutter blades 1 and 2; an image sensor driving circuit 13 to drive the image sensor 3; and a clock pulse generator circuit 14 to generate clock pulses VD, HD, etc. which are periodically supplied to the image sensor driving circuit 13 at predetermined time intervals as periodic signals. The pulses VD and HD are vertical and horizontal synchronizing signals. The device is further provided with a sequence control circuit 15 which performs sequence control over the stop driving circuit 11, the first and second shutter driving circuits 201 and 202, the clock pulse generator circuit 14, the medium driving circuit 10 and the gates G1 and G2; and a release circuit 16 which instructs the shutter means to operate to begin a still picture image sensing process. FIG. 4 schematically shows, by way of example, the arrangement of the image sensor 3, which is, in this case, a frame transfer type CCD.

Referring to FIG. 4, an image sensing part 31 receives light and is provided with a plurality of vertical shift registers for converting an object image into an electrical signal upon receipt of the object image via the optical system 4 and the stop 5. A storage part 32 is shielded from light and is provided with a plurality of vertical shift registers for storing an electric charge which is vertically transferred from the vertical shift registers of the image sensing part 31. A horizontal shift register 33 simultaneously stores one bit of the content of each of the vertical shift registers of the storage part 32 and permits reading by horizontally transferring them. An output amplifier 34 converts an electric charge signal into a voltage. Pulses $\phi1$-$\phi3$ are applied to the image sensor 3 for respectively driving the image sensing part 31, the storage part 32 and the register 33.

Figure 5:
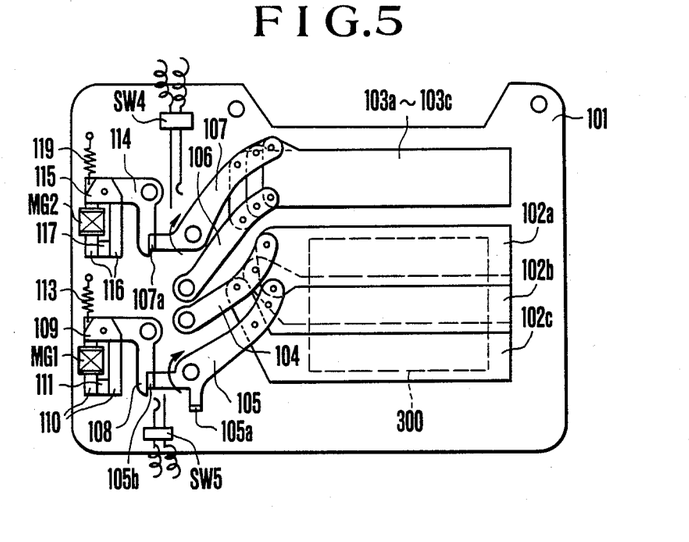
FIG. 5 is a plan view showing, by way of example, the arrangement of a shutter device.

FIG. 5 shows the arrangement of the shutter blades 1 and 2. The shutter arrangment includes a shutter base plate 101; leading shutter blades 102a-102c which jointly form the first shutter blade 1 and which are pivotally carried by leading blade arms 104 and 105. The leading blade arm 105 is urged to move in the direction of the arrow by a spring (not shown). One end 105b of the arm 105 is locked by engaging one end of a leading blade clamping lever 108 which is pivotally carried by the shutter base plate 101. The leading blade arm 105 is provided with a projection 105a for the purpose of pushing and turning on a leading blade travel completion switch SW5 immediately before the end of the travel of the leading blade 102a-102c. An armature 109 is pivotally carried by the leading blade clamping lever 108 and is attracted by a magnet 111 to stick to a yoke 110 against a clockwise urging force of a spring 113. Trailing blades 103a-103c form the second shutter blade 2 and are pivotally carried by trailing blade arms 106 and 107. The trailing blade arm 107 is urged to move clockwise in the direction of an arrow by a spring (not shown). One end 107a of the arm 107 engages with a trailing blade clamping lever 114 and the arm 107 is thus prevented from turning clockwise. An armature 115 is pivotally carried by the trailing blade clamping lever 114. The armature 115 is attached to a yoke 116 by a magnet 117 against a clockwise urging force of spring 119. The shutter base plate 101 is provided with an opening 300. Furthermore, the end 107a of the trailing blade arm 107 pushes and turns on a travel completion signal switch SW4 which serves as closure detecting means immediately before the travel of the trailing shutter blade 103a-103c comes to an end. Coils MG1 and MG2 cancel the magnetic fluxes of the magnets 111 and 117 when these coils MG1, MG2 are energized.

Furthermore, the travel completion signal switch SW4 is turned on after the point of time t51 shown in FIG. 2.

Figure 6:
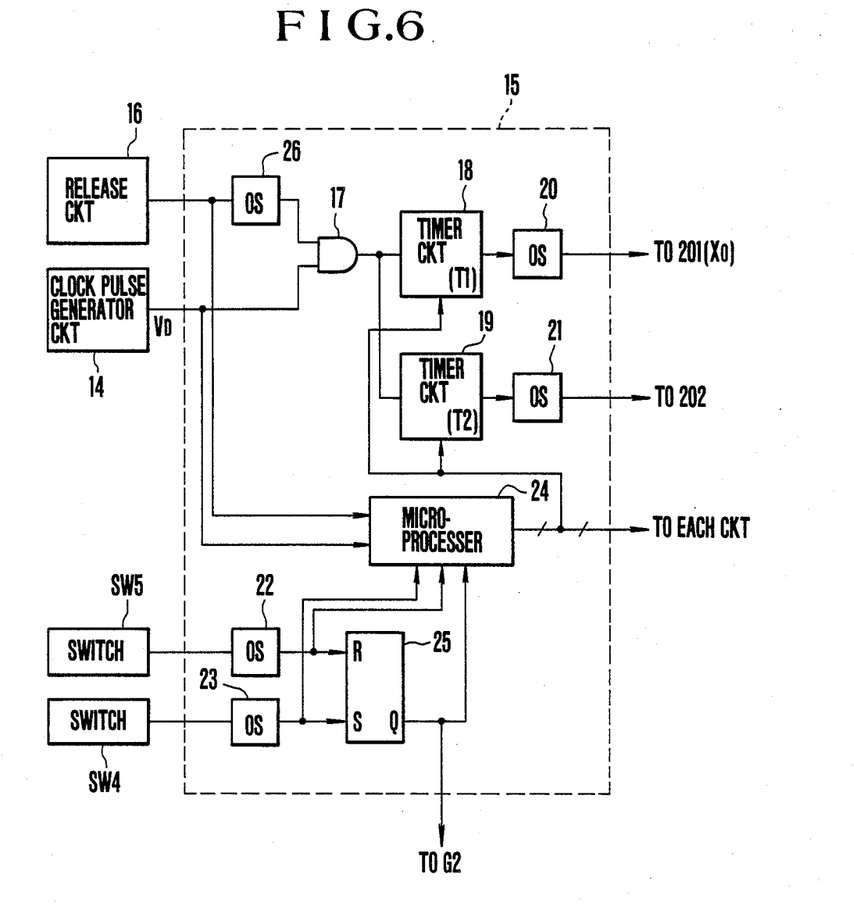
FIG. 6 is a block diagram showing the arrangment of a sequence control circuit.

FIG. 6 shows, by way of example, the arrangement of the seqence control circuit 15 which is included in the embodiment. The sequence control circuit 15 includes an AND gate 17; first and second timer circuits 18 and 19 which serve as first and second timer means; one-shot circuits 20, 21, 22, 23 and 26; micro-processer 24; and an R-S flip-flop 25.

Figure 1A:
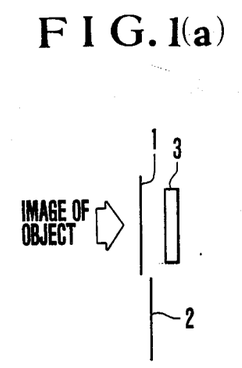
Figure 1B:
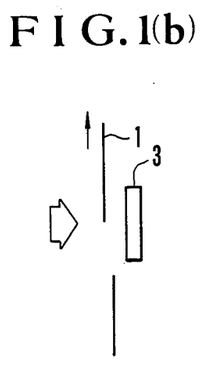
Figure 1C:
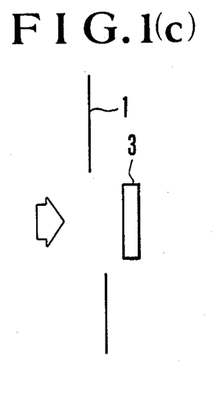
Figure 1D:
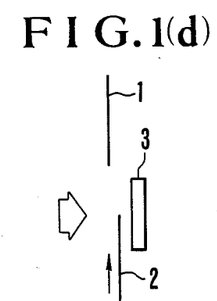
Figure 1E:
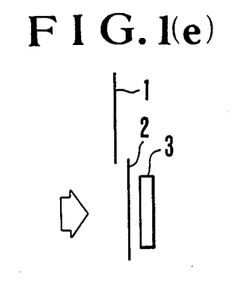
Figure 7:
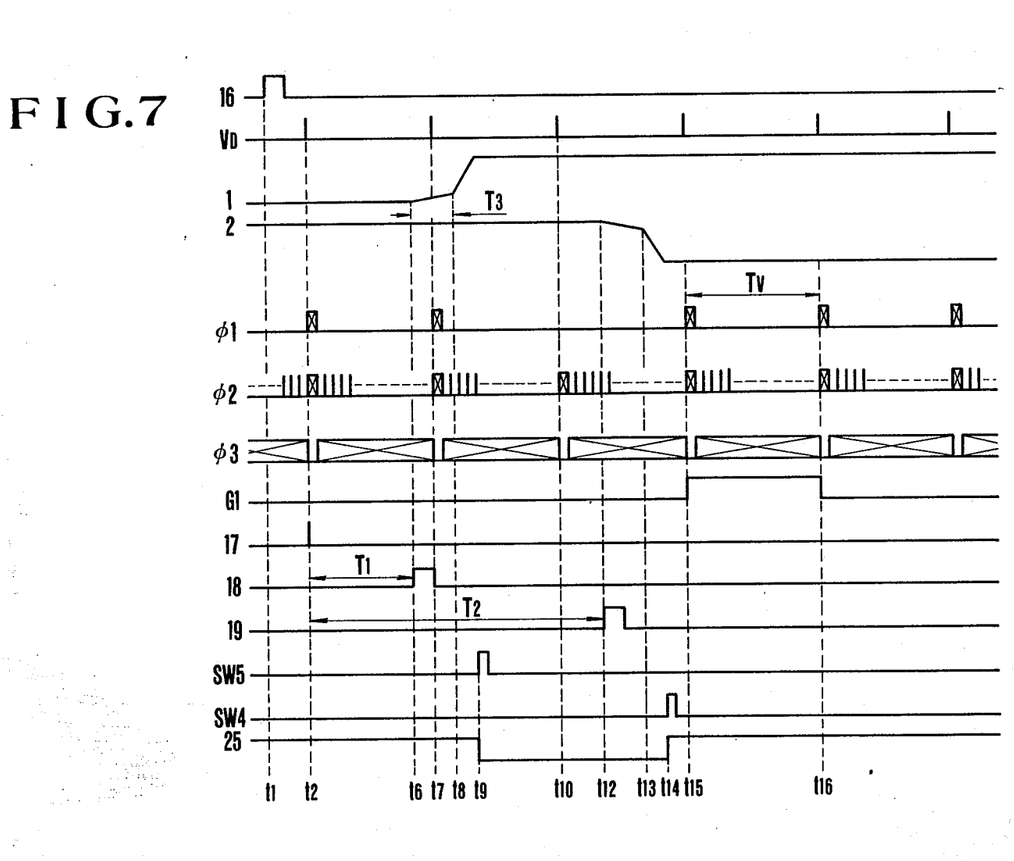
FIG. 7 is a timing chart showing the operation of the image sensing device of FIG. 3 in a first embodiment.

FIG. 7 is a timing chart showing the operation of this embodiment. The operation of the arrangement of the embodiment shown in FIGS. 1 (a) through 6 will be described below with reference to the timing chart of FIG. 7:

The whole image sensing device assumes a stand-by condition when a main power supply (not shown) in turned on. Under this condition, the clock pulse generator 14 and the output terminal of the image sensor driving circuit 13 are constantly producing pulses $\phi1$-$\phi3$ which are shown in FIG. 7. In other words, vertical transfer caused by the pulses $\phi1$ and $\phi2$ is periodically effected with one vertical period Tv of the standard television system used as the period of the periodic transfer. This vertical transfer is performed within the vertical blanking period of the standard television system. The electric charge of the image sensing part 31 is thus transferred to the storage part 32. Following this, with the pulse $\phi2$ supplied once during every horizontal blanking period, the electric charge within the storage part 32 is vertically transferred, one line at a time, and at intervals of one horizontal period, to the horizontal register 33 to be stored there. The electric charge vertically transferred from the storage part 32 is read out via the amplifier 34 with a plurality of pulses $\phi3$ rapidly supplied to the register 33 for each pulse $\phi2$.

The medium driving circuit 10 is servo controlled to also rotate the medium 8 at the period of the standard television system. Under this condition, the gate G1 is closed and thus no output of the recording modulation circuit 7 is supplied to the head 9. Furthermore, under this condition, the flip-flop 25 is in a set state. The output Q of the flip-flop 25 is at a high level to open the gate G2. Next, when the release button (not shown) is operated at a point of time t1, a pulse is produced from the release circuit 16. The pulse output of the release circuit 16 causes the one-shot circuit 26 to produce a high level pulse which is somewhat longer than one vertical period. Meanwhile, since the vertical synchronizing signal VD is produced at every vertical period from the clock pulse generator 14, the logical product of the signal VD and the output of the one-shot circuit 26 is obtained at the AND gate 17. Then, the output of the AND gate 17 is supplied respectively to the timer circuits 18 and 19. The timer circuit 18 counts as much as a length of time T1 and produces a pulse at a point of time t6.

This cause the one-shot circuit 20 produce a pulse of a predetermined level and a predetermined width. The shutter driving circuit 201 is driven by this pulse to supply power to the coil MG1 to FIG. 5. Then, the armature 109, which is pivotally carried by the leading blade clamping level 108, is released from the attraction of the magnet 111 and is turned to the right by the spring 113.

This cause the arm 105 to be turned to the right by the force of a spring (not shown). Then, the leading blades 102a-102c begin to move downward, as viewed on the illustration of FIG. 5. The upper end of the leading blade 102a (see FIG. 5) reaches a point lower than the upper end of the opening 300 and an actual exposure begins at a point of time t8 after the lapse of time T3 from the start of power supplied to the coil MG1.

In this embodiment of the invention, the length of time T1 to be counted by the timer 18 is:

$$Tv - T3 < T1 < Tv \tag{1}$$

Therefore, even where the response delay time T3 is as much as 8 msec or thereabouts as mentioned in the foregoing, an apparent response delay time can be shortened by this arrangement of the embodiment.

Furthermore, the switch SW5 turns on at a point of time t9 when the travel of the leading shutter blade 102a–102c comes to an end shortly after commencement of the exposure. The flip-flop 25 is then reset via the one-shot circuit 22. The level of the output Q of the flip-flop 25 becomes low to close the gate G2. With the gate G2 closed, the supply of the clock pulse $\phi1$ from the driving circuit 13 to the image sensor 3 is cut off. Therefore, even in the event that the shutter time (T2−T1) spans two fields, the pulse $\phi1$ is never supplied before completion of a storing process.

In the meantime, other pulses $\phi2$ and $\phi3$ are still being periodically supplied in the same manner as before to have the content of the storage part 32 of the image sensor 3 constantly read out.

At a point of time t2, when a high level signal is produced from the AND gate 17, the timer circuit 19 performs a time counting operation during a length of time T2. A value T2−T1 in this case corresponds to an exposure time. This value T2−T1 is either manually or automatically set on the basic of the brightness of an object to be photographed.

At a point of time t12 after the lapse of the time T2 from the point of time t2, a pulse is produced from the timer circuit 19. This pulse is converted into a pulse of a predetermined level and a predetermined width by the one-shot circuit 21. The converted pulse thus obtained is supplied to the shutter driving circuit 202.

As a result, the coil MG2 is energized to cancel the magnetic field of the magnet 117. The spring 119 then turns the lever 114 to the right. This causes the arm 109 to begin to turn to the right. Accordingly, the shutter blades 103a–103c close the opening 300. The switch SW4 is turned on at a point of time t14 immediately after the opening 300 is completely closed. This causes the flip-flop 25 to be set via the one-shot circuit 23 and the level of the output Q thereof becomes high. Therefore, the gate G2 is again opened to permit the pulse $\phi1$ to be supplied to the image sensor 3.

With the gate G2 thus opened, when the pulses $\phi1$ and $\phi2$ are supplied at a point of time t15, the electric charge of the image sensing part 31 obtained with the part 31 exposed during a period of time T2−T1 is stored at the storage part 32. During a period of time from the point t15 to another point t16, the stored electric charge is read out by means of the pulse $\phi3$.

Meanwhile, since the gate G1 is opened over the period of t15−t16 by a control signal produced from the micro-processor 24, the image signal thus obtained is recorded via the head 9 in a predetermined position on the medium 8.

Such being the arrangement of this embodiment, no transfer is performed before the shutter blades 1, 2 are completely closed. Therefore, the device effectively prevents any erroneous exposure that tends to result from variations in the operation ensuing during actuation of the trailing shutter blade 103a–103c so that such troubles as smears and uneven exposure can be eliminated. Furthermore, in the embodiment, the time 18 is actuated by a periodic signal produced after operation of the release switch and the exposure operation is started by the output of this timer 18. This arrangement eliminates the adverse effect of a delay in the operation which is dependent on the responsiveness of the shutter device.

It is another advantage of the embodiment that the leading 102a–102c and trailing shutter blades 103a–103c respectively begin to travel by the outputs of two timers 18, 19 which are responsive to the periodic signals produced after the operation of the release switch to facilitate adjustment of the travelling interval between the leading 102a–102c and trailing blades 103a–103c and their overlapping degree.

Figure 8:
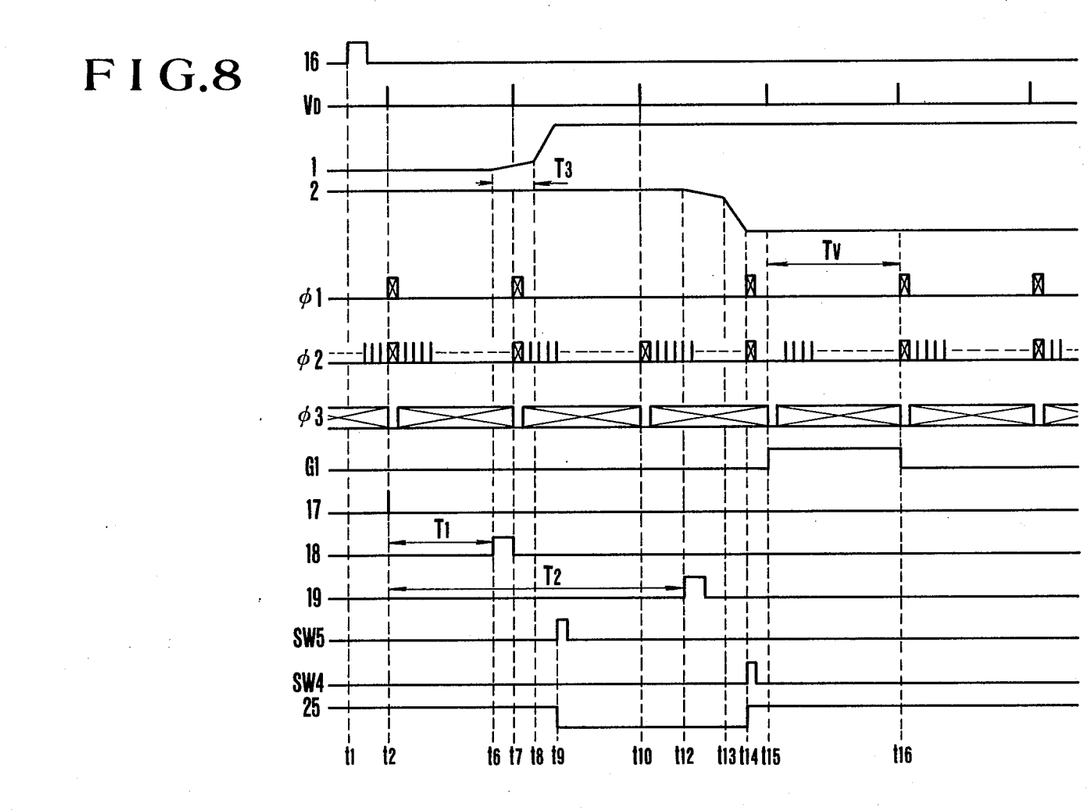
FIG. 8 is a timing chart showing the operation of the same in a second embodiment.

FIG. 8 is a timing chart showing the operation of a second embodiment of this invention. In this case, the vertical transfer by the pulses $\phi1$ and $\phi2$ is controlled to be performed immediately after detection of completion of the travel of the trailing shutter blade 103a–103c. This arrangement is intended to prevent any smear resulting from the bound or bounce of the shutter. Generally, reduction in weight of the shutter blades 1, 2 results in a bouncing phenomenon which takes place when the shutter blades 1, 2 impinge upon stoppers after completion of their travels. This bouncing phenomenon tends to cause the image sensing part 31 to be again exposed after it has been covered by the shutter and thus hinders the effort to prevent smears. In view of this, this embodiment is to prevent the smears due to the bouncing phenomenon, to supply the electric charge transfer after completion of the travel of the trailing shutter blade 103a–103c and to adjust or absorb any disturbance that may result from this by the timing for the reading process.

Referring to FIG. 8, this embodiment differs from the preceding embodiment shown in FIG. 7 in the following points: When the switch SW4, which detects completion of the travel of the trailing blade 103a–103c turns on at a point of time t14 to cause the level of the output Q of the flip-flop 25 to become high, the rise of this output causes the micro-processor 24 to supply the pulses $\phi1$ and $\phi i$ in numbers corresponding to the number of lines of data of the image sensing part 31; and, after that, the vertical transfer to be effected by the pulses $\phi1$ and $\phi2$ in synchronization with the vertical synchronizing signal VD is omitted in this case. However, after the point of time t15, the lines of data of the storage part 32 are vertically transferred to the register 33, one, by one according to the pulse $\phi2$ and read out in a normal manner.

This embodiment is arranged as shown in FIG. 6 and is driven as shown in FIG. 8, instead of FIG. 7. Then, since the electric charge of the image sensing part 31 is transferred to the storage part 32 before bounce of the trailing blade 103a–103c occurs the possible deterioration of picture due to the bouncing phenomenon can be minimized.

Figure 9:
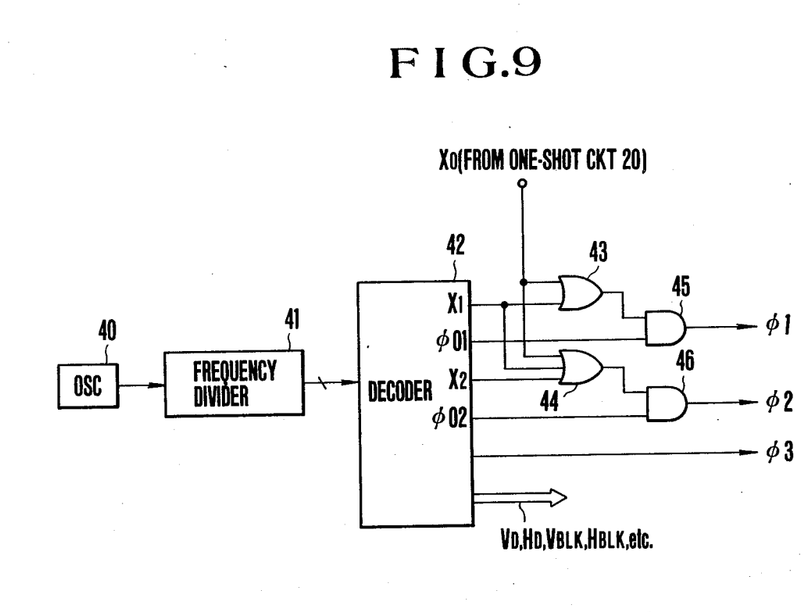
FIG. 9 is a circuit diagram showing the clock pulse generator circuit 14 of an image sensing device arrangement in a third embodiment of the invention.

FIG. 9 shows the arrangement of a clock pulse generator circuit 14 in a third embodiment of this invention. The clock pulse generator circuit 14 includes an oscillator 40; a frequency divider 41; a decoder 42; OR gates 43 and 44 which are clearing means; and AND gates 45 and 46. A reference signal formed by the oscillator 40 is frequency divided into different frequency signals by the frequency divider 41. Pulses $\phi1$–$\phi3$ are then formed by processing these different frequency signals through the groups of gate circuits combined by the decoder 42.

In FIG. 9, a reference symbol X1 identifies an instruction signal which is at a high level for a predetermined length of time during a vertical blanking period and is produced for the purpose of causing the signal of the image sensing part 31 to be vertically transferred to the storage part 32. Another symbol X2 identifies an instruction signal which is at a high level for a predetermined length of time during a horizontal blanking period and is produced for the purpose of causing the lines of the signal data of the storage part 32 to be vertically transferred one by one, to the register 33.

A signal X0 identifies a pulse signal produced from the sequence control circuit 15 for the purpose of clearing the signal of the image sensing part 31 at a desired timing. Pulses $\phi1$ and $\phi2$ are of the same frequency as the pulses $\phi1$ and $\phi2$ and are constantly produced. Accordingly, when the signal X0 and X1 is at a high level, the pulse $\phi1$ is produced as the pulse $\phi1$. The pulse $\phi2$ is produced as the pulse $\phi2$ when the signal X0, X1 or X2 is at a high level.

Figure 10:
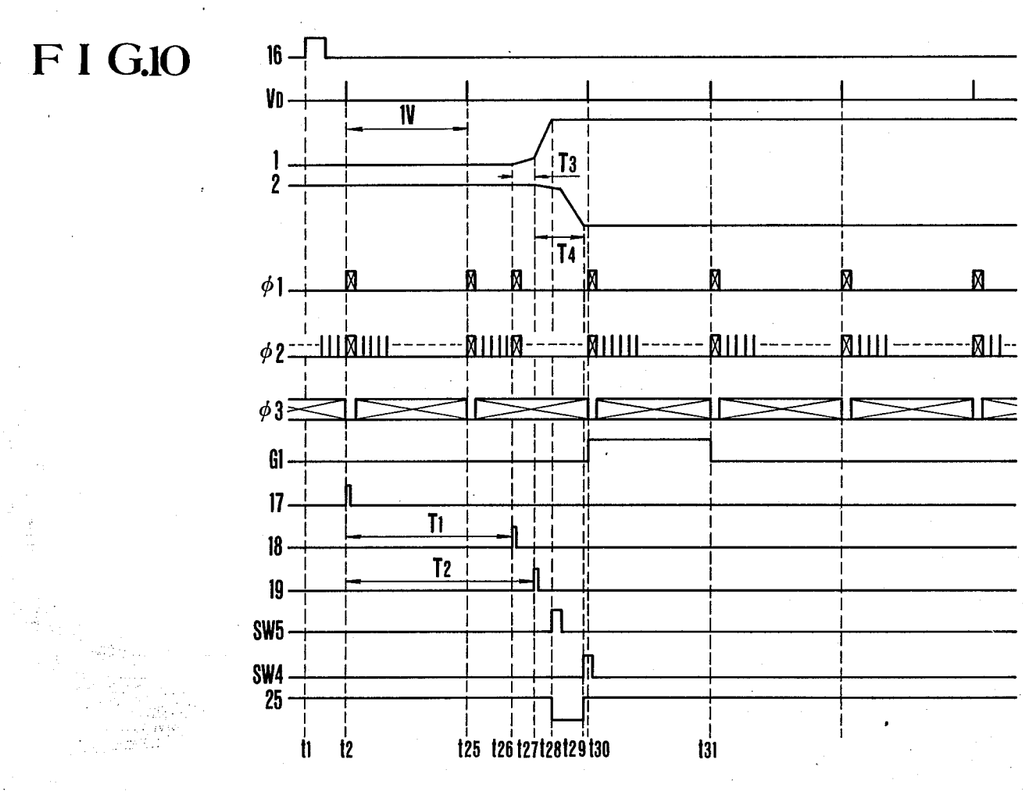
FIG. 10 is a timing chart showing the operation of the third embodiment.

FIG. 10 is a timing chart relative to this embodiment. The operation of this embodiment will be described below with reference to FIG. 10:

The whole image sensing device assumes a stand-by condition with a main power supply (not shown) turned on. Under this condition, the output terminals of the clock pulse generator circuit 14 and the image sensor driving circuit 13 periodically produce the pulses $\phi1$-$\phi3$, which are as shown in FIG. 8. With these pulses thus produced, the image signal of the image sensor 3 is periodically read out. When a release switch (not shown) is operated at a point of time t1, a pulse is produced from the release circuit 16. In response to this pulse, the one-shot circuit 26 produces a pulse of a predetermined width. Then, the gate 17 produces, at a point of time t2, an AND output obtained from the output of the one-shot circuit 26 and a vertical synchronizing signal. In response to this AND output, the timer circuits 18 and 19 begin to operate. Then, the one-shot circuit 20 produces a pulse at a point of time which is later, by a period of time T1 than the point of time t2. This pulse output of the one-shot circuit 20 causes the leading shutter blade 102a-102c to begin to operate. Meanwhile, the output of the one-shot circuit 20 is supplied as the signal X0 to the OR gates 43 and 44, which are arranged as shown in FIG. 9. Then, the pulses $\phi1$ and $\phi2$ are supplied transferring the signal of the image sensing part 31 to the register 33. Therefore, during a period between points of time t25 and t26, a dark current which has developed at the image sensing part 31 is completely removed, so that the S/N ratio can be improved.

In accordance with the arrangement of this embodiment, the response time of the device can be ignored by just setting the counting time T1 of the timer circuit 18 at a suitable length of time, including an anticipated delay time T3. In this embodiment, the actual exposure is performed immediately before reading. Therefore, a dark current noise which takes place after the exposure is almost completely ignorable. In other words, the time T2 is set at a fixed value and is counted back from an exposure time (T2−T1).

More specifically, in this embodiment, a driving action on the trailing blade 103a-103c begins earlier (at a point of time t27) than a vertical transfer time t30 by a length of time (t29−t27−T4) estimated for the travel of the trailing blade 103a-103c from the travel start time t27 to a travel completion time t29. In addition to this arrangement, the length of time T2 to be counted by the timer circuit 19 for setting the point of time t27 is predetermined. This can be expressed as follows: T2≅2V−T4, wherein V represents the vertical period. In the event of an exposure time TE>V, the counting time T2 is T2≅3V−T4. In this case, the pulse $\phi1$ is omitted during the exposure. Furthermore, where the leading 102a-102c and trailing shutter blades 103a-103c have excellent responsiveness, the counting time may be T2≅V−T4. Meanwhile, the length of time T1 to be counted by the other timer circuit 18 varies with the exposure time TE. When the exposure time is either automatically or manually set, the micro-processor 24 computes T1≅TE−T2 on the basis of the exposure time TE. Then, the counting length of time T1 of the timer circuit 18 is adjusted based on the result of this computation Xoc.

When a high level signal is produced from the AND gate 17 at a point of time t2, the timer circuit 19 counts the time T2. The length of time T2−T1 corresponds to the exposure time and is either manually set or automatically set according to the brightness of the object to be photographed, etc. At a point of time t27 when the time T2 has lapsed from the point of time t2, the timer circuit 19 produces a pulse output. The pulse is then converted by the one-shot circuit 21 into a pulse of a predetermined level and a predetermined width and is supplied to the shutter driving circuit 202. This causes the trailing shutter blades 103a, 103b and 103c to travel. The exposure comes to an end. At a point of time t29 immediately after the opening 300 has been completely closed, the switch SW4 turns on. This causes the flip-flop 25 to be set via the one-shot circuit 23. The level of the output Q of the flip-flop 25 becomes high. Therefore, again the gate G2 is opened to allow the pulse $\phi1$ to be supplied to the image sensor.

When the pulses $\phi1$ and $\phi2$ are supplied to the image sensor at a next point of time t30, the electric charge of the image sensing part 31 which has been exposed to light for the period of time T2−T1 is stored at the storage part 32. Then, during a period of time T30−t31, the pulses $\phi2$ and $\phi3$ cause the stored electric charge to be read out from the horizontal register 33.

Meanwhile, a control signal produced from the microprocesser 24 which has been programmed with a predetermined sequence causes the gate G1 to be open during the period of time t30−t31. Therefore, an image signal is recored via the head 9 in a predetermined position on the medium 8.

Since the lengths of time T1 and T2 to be counted by the timer circuits are arranged to have the end of an exposure come immediately before a reading process, the adverse effect of a dark current arising after the exposure is almost completely ignorable. Besides, a dark current which arises before commencement of the exposure is removed by the abovestated clearing action. Therefore, an image signal of an excellent S/N ratio can be obtained.

In this embodiment, since the electric charge transferring process does not take place before the trailing blade has been completely closed, any erroneous exposure operation due to uneven shutter movement after the start of the trailing shutter blade can be prevented to eliminate the possibility of smears and uneven exposure. Another advantage of this embodiment resides in that the arrangement to have the length of time T2 at a fixed value obviates the necessity for the use of switch SW4 for detecting completion of the travel of the trailing blade.

What is claimed is:
1. An image sensing device comprising:
image sensing means arranged to convert an optical image into an electrical signal;
shutter means for blocking light incident upon said image sensing means;
periodic signal generating means for generating periodic signals for driving said image sensing means;

a switch means arranged to generate an instruction to operate said shutter means;

delay means arranged to operate in response to a predetermined periodic signal produced after the instruction generated by said switch means; and shutter driving means arranged to cause said shutter means to begin to open after the lapse of time delayed by said delay means, said shutter driving means then closing said shutter means.

2. A device according to claim 1, wherein the shutter means takes a first time after it starts to operate from the state blocking the light to the image sensing means until the light substantially enters said image sensing means.

3. A device according to claim 2, wherein the sum of said first time and said delay time by said delay means is longer than the period of said periodic signal.

4. A device according to claim 2, wherein said first time is shorter than the period of said periodic signal.

5. An image sensing device according to claim 1, wherein said periodic signal is a signal of a standard television frequency.

6. An image sensing device according to claim 5, wherein said periodic signal has a filed frequency.

7. An image sensing device comprising:

image sensing means arranged to convert an optical image into an electrical signal;

shutter means for blocking light incident upon said image sensing means;

periodic signal generating means for forming periodic signals to be used for driving said image sensing means.

a switch means arranged to generate an instruction for operating said shutter means;

delay means arranged to operate in response to a periodic signal produced after the instruction generated by said switch means;

shutter driving means arranged to start exposure by said shutter means after the lapse of a predetermined length of time delayed by said delay means; and clearing means for clearing the electrical signal within said image sensing means in relation to the start of operation of said shutter driving means.

8. A device according to claim 7, wherein said clearing means performs a clearing operation by reading out the electrical signal of said image sensing means at a relatively high speed.

9. A device according to claim 8, wherein said clearing means is arranged to clear said image sensing means by using a portion of the output of said periodic signal generating means.

10. A device according to claim 7, wherein said shutter means blocks the light from entering said image sensing means until exposure is started by said shutter driving means.

11. A device according to claim 10, wherein said shutter means includes two shutter blades.

12. An image sensing device according to claim 7, wherein said periodic signal is a signal of a standard television frequency.

13. An image sensing device according to claim 12, wherein said periodic signal has a field frequency.

14. An image sensing device comprising:

image sensing means arranged to convert an optical image into an electrical signal;

shutter means for blocking light incident upon said image sensing means;

periodic signal generating means arranged to form a periodic signal for controlling recording means for recording said electrical signal;

switch means arranged to generate an instruction for operating said shutter means;

shutter driving means arranged to cause said shutter means for perfom exposure control, said shutter driving means operating in response to at least the operation of said switch means; and time means arranged to have the end of said exposure control come immediately before the periodic signal.

15. A device according to claim 14, wherein said timer means is arranged to begin to operate in response to at least the operation of said switch means.

16. A device according to claim 14, further comprising clearing means arranged to clear the electrical signal within said image sensing means in relation to commencement of said exposure control.

17. An image sensing device according to claim 14, wherein said periodic signal is a signal of a standard television frequency.

18. An image sensing device according to claim 17, wherein said periodic signal has a field frequency.

19. An image sensing device comprising:

an image sensing part arranged to convert an optical image into an electrical signal;

storage part arranged to store the electrical signal of said image sensing part;

periodic signal generating means for forming periodic signals to be used for transfer of the electrical signal of said image sensing part to said storage part;

shutter means for blocking light incident upon said image sensing part;

closure detecting means for detecting shift of said shutter means from an open state to closed state; and inhibiting means for inhiting said transfer from being caused by said periodic signal generating means during a period after commencement of a still picture image sensing process and before the output of said closure detecting means is obtained.

20. A device according to claim 19, wherein said inhibiting means includes memory means.

21. A device according to claim 20, wherein said memory means includes a flip-flop.

22. A device according to claim 19, wherein said inhibiting means includes gate means which is under the control of the output of said storing means.

23. A device according to claim 19, wherein said image sensing part includes an electric charge transferring arrangement.

24. An image sensing device according to claim 19, wherein said periodic signal is a signal of a standard television frequency.

25. An image sensing device according to claim 24, wherein said periodic signal has a field frequency.

26. An image sensing device comprising:

image sensing means arranged to convert an optical image into an electrical signal;

shutter means for blocking light incident upon said image sensing means;

periodic signal generating means for generating periodic signals for driving said image sensing means;

a switch means arranged to give an instruction to operate said shutter means;

first timer means arranged to operate in response to a predetermined periodic signal produced after the operation of said switch means; and shutter driving means arranged to cause said shutter means to begin to open after the lapse of time counted by said first timer means;

and further comprising a second timer means which is arranged to begin to operate in response to a predetermined periodic signal produced after the operation of said switch means which gives an instruction for operating said shutter means.

27. A device according to claim 26, wherein said second timer means is arranged to start operating at the same timing as said first timer means.

28. A device according to claim 26, wherein said shutter driving means starts operating for causing said shutter means to open after the lapse of a predetermined length of time counted by said first timer means and starts operating to cause said shutter means to close after the lapse of a predetermined length of time counted by said second timer means.

29. A device according to claim 28, wherein the length of time to be counted by said second timer means is arranged to have a timing at which said shutter means completely closes come immediately before a predetermined periodic signal produced for said reading.

30. A device according to claim 26, further comprising clearing means for clearing the electrical signal within said image sensing means in response to the output of said first timer means.

31. A device according to claim 26, wherein the length of time to be counted by said first timer means is shorter than the length of time to be counted by said second timer means.

32. A device according to claim 31, wherein the length of time to be counted by said first timer means is set at a fixed value while the length of time to be counted by said second timer means is variable.

33. A device according to claim 32, further comprising:
closure completion detection means arranged to detect completion of a closing action of said shutter means; and
inhibiting means for inhibiting said reading from being performed after the start of the operation of said first timer means until the output of said closure completion detecting means is obtained.

34. A device according to claim 31, wherein the length of time to be counted by said second timer means is set at a fixed value while the length of time to be counted by said first timer means is variable.

35. An image sensing device according to claim 26, wherein said periodic signal is a signal of a standard television frequency.

36. An image sensing device according to claim 35, wherein said periodic signal has a field frequency.

37. An image sensing device comprising:
image sensing means arranged to convert an optical image into an electrical signal;
shutter means for blocking light incident upon said image sensing means;
periodic signal generating means for forming periodic signals for controlling recording means for recording said electrical signal;
switch means arranged to give an instruction for operating said shutter means;
first timer means arranged to operate in response to at least the operation of said switch means;

shutter driving means arranged to start exposure by said shutter means after the lapse of a predetermined length of time counted by said first timer means; and clearing means for clearing the electrical signal within said image sensing means prior to commencement of exposure by said shutter driving means;

and wherein said first timer means is arranged to have the end of the period of exposure control come immediately before a predetermined one of said periodic signals.

38. A device according to claim 37, further comprising a second timer means which is arranged to begin to operate in response to a predetermined second one of said periodic signals produced after the operation of said switch means which gives an instruction for operating said shutter means.

39. A device according to claim 38, wherein said second timer means is arranged to start operating at the same timing as said first timer means.

40. A device according to claim 38, wherein said shutter driving means starts operating for causing said shutter means to open after the lapse of a predetermined length of time counted by said first timer means and starts operating to cause said shutter means to close after the lapse of a predetermined length of time counted by said second timer means.

41. A device according to claim 40, wherein the length of time to be counted by said first timer means is longer than the length of time to be counted by said second timer means.

42. A device according to claim 38, wherein the length of time to be counted by said first time means is shorter than the length of time to be counted by said second timer means.

43. A device according to claim 42, wherein the length of time to be counted by said second timer means is set at a fixed value while the length of time to be counted by said first timer means is variable.

44. An image sensing device according to claim 37, wherein said predetermined periodic signal is a signal of a standard television frequency.

45. An image sensing device according to claim 44, wherein said predetermined periodic signal has a field frequency.

46. An image sensing device comprising:
(a) image sensing means arranged to convert an optical image into an electrical signal;
(b) shutter means for blocking light incident upon said image sensing means;
(c) periodic signal generating means for generating periodic signals for driving said image sensing means;
(d) instruction means for generating an instruction to operate said shutter means;
(e) timer means for generating first and second timer output signals after predetermined first and second timer output signals after predetermined first and second times in response to said periodic signal after the operation of said switch; and
(f) shutter driving means for opening and closing said shutter means in response to said first and second timer output signals, resepectively.

47. An image sensing device according to claim 46, wherein at least one of said predetermined first and second times is a fixed value.

48. An image sensing device according to claim 46, wherein said shutter means includes first and second shutter blades.

49. An image sensing device according to claim 48, wherein said first and second shutter blades operate in response to said first and second timer output signals, respectively.

50. An image sensing device according to claim 49, wherein said first and second shutter blades each open and close the shutter means.

51. An image sensing device according to claim 46, further comprising:
clearing means for clearing the electrical signal within said image sensing means in relation to the first timer output.

52. An image sensing device according to claim 46, wherein said second timer output signal is set in such a manner that the timing of completion of said shutter means closure comes just before said periodic signal.

53. An image sensing device according to claim 46, wherein said first time is shorter than said second time.

54. An image sensing device according to claim 46, wherein one of said first and second times is fixed and the other is variable.

55. An image sensing device according to claim 46, wherein siad timer means includes means for prohibiting the read out of the signal from said image sensing means until said shutter means closes after the operation of said timer means.

56. An image sensing device according to claim 46, wherein said periodic signal is a signal of a standard television frequency.

57. An image sensing device according to claim 56, wherein said periodic signal has a field frequency.

58. An image sensing device according to claim 46, where said timer means includes a micro-processor.

59. An image pickup device comprising:
(a) image sensing means arranged to convert an optical image into an electrical signal;
(b) record means for recording said electrical signal of said image sensing means, said record means having driving means for periodically driving said record means;
(c) trigger means for generating an instruction for recording one picture of said electrical signal of said image sensing means; and
(d) control means for exposing said image sensing means for a predetermined period in response to said instruction of said trigger means, and for then recording said electrical signal in synchronism with said driving means, wherein said predetermined period is varialbly controllable, and said control means changes a start timing of said exposure according to said predetermined period.

60. A device according to claim 59, wherein said record means includes a head for recording said electrical signal and a recording medium diposed in opposed relation to said head, said driving means being arranged to cause relative displacement between said head and said recording medium.

61. A device according to claim 60, wherein said driving means is arranged to rotate said recording medium.

62. A device according to claim 61, wherein said driving means is arranged to periodically rotate said recording medium.

63. A device according to claim 59, wherein said control means includes timer means for changing the start timing of the exposure period depending upon a length of said exposure period.

64. A device according to claim 59, wherein said trigger means includes a manually operable switch.

65. A device according to claim 64, wherein said trigger means is arranged to generate an instruction in synchronizing relation to said driving means after an operation of said manually operable switch.

66. A device according to claim 59, wherein said control means includes a shutter for controlling said exposing.

67. A device according to claim 66, wherein said control means is arranged to clear said electrical signal of said image sensing means, prior to said exposing.

68. A device according to claim 59, wherein said control means is arranged to change said start timing of said exposing so that the terminal end of said exposing is positioned immediately before said recording.

69. An image pickup device comprising:
(a) image sensing means arranged to convert an optical image into an electrical signal;
(b) record means for recording said electrical signal of said image sensing means, said record means having driving means for periodically driving said record means;
(c) trigger means for generating an instruction for recording one picture of said electrical signal of said image sensing means; and
(d) control means for starting said converting operation by clearing the electrical signal in said image sensing means, and for recording said electrical signal in synchronism with said driving means after said converting operation is finished, wherein a period of said converting operation is variably controllable, and said control means changes a start timing of said converting operation according to said period.

70. A device according to claim 69, wherein said record means includes a head for recording said electrical signal and a recording medium disposed in opposed relation to said head, said driving means being arranged to cause relative displacement between said head and said recording medium.

71. A device according to claim 70, wherein said driving means is arranged to rotate said recording medium.

72. A device according to claim 71, wherein said driving means is arranged to periodically rotate said recording medium.

73. A device according to claim 69, wherein said control means includes timer means for changing the start timing of the said period depending upon a length of said period.

74. A device according to claim 69, wherein said trigger means includes a manually operable switch.

75. A device according to claim 74, wherein said trigger means is arranged to generate an instruction in synchronizing relation to said driving means after an operation said manually operable switch.

76. A device according to claim 69, wherein said control means includes a shutter for effecting said converting operation by exposing the image sensing means after said clearing.

77. A device according to claim 76, wherein the exposing period of said shutter substantially corresponds to

* * * * *